United States Patent
Barth et al.

(10) Patent No.: US 10,787,271 B2
(45) Date of Patent: Sep. 29, 2020

(54) SYSTEM FOR REDUNDANT SUPPLY OF KINETIC ENERGY TO DRIVE SYSTEM OF AIRCRAFT

(71) Applicant: SIEMENS AKTIENGESELLSCHAFT, Munich (DE)

(72) Inventors: Peter Barth, Nuremberg (DE); Klaus Braun, Herzogenaurach (DE); Stefan Dünsbier, Regensburg (DE)

(73) Assignee: Rolls-Royce Deutschland Ltd & Co KG, Blankenfelde-Mahlow (DE)

( * ) Notice: Subject to any disclaimer, the term of this patent is extended or adjusted under 35 U.S.C. 154(b) by 397 days.

(21) Appl. No.: 15/744,329

(22) PCT Filed: Jun. 28, 2016

(86) PCT No.: PCT/EP2016/065031
§ 371 (c)(1),
(2) Date: Jan. 12, 2018

(87) PCT Pub. No.: WO2017/009037
PCT Pub. Date: Jan. 19, 2017

(65) Prior Publication Data
US 2018/0201384 A1    Jul. 19, 2018

(30) Foreign Application Priority Data

Jul. 13, 2015   (DE) ......................... 10 2015 213 026

(51) Int. Cl.
B64D 27/24    (2006.01)
B64D 31/06    (2006.01)
(Continued)

(52) U.S. Cl.
CPC ............. B64D 27/24 (2013.01); B64D 31/06 (2013.01); B64D 35/08 (2013.01); B64D 35/02 (2013.01);
(Continued)

(58) Field of Classification Search
CPC ........ B64D 27/24; B64D 31/06; B64D 35/08; B64D 35/02
See application file for complete search history.

(56) References Cited

U.S. PATENT DOCUMENTS

2009/0131215 A1\* 5/2009 Shamoto ................ B60K 6/365
477/3
2010/0012407 A1   1/2010 Oba et al.
(Continued)

FOREIGN PATENT DOCUMENTS

DE    102007017332 A1    10/2008
DE    102009019485 A1    6/2010
(Continued)

OTHER PUBLICATIONS

German Search Report for related German Application No. 10 2015 213 026.6 dated Jun. 2, 2016.
(Continued)

*Primary Examiner* — Justin M Benedik
(74) *Attorney, Agent, or Firm* — Lempia Summerfield Katz LLC

(57) ABSTRACT

The invention relates to the redundant supply of kinetic energy to a drive system of an aircraft in order to ensure in each case largely safe operation of the aircraft during normal operation of the system and also in various emergency scenarios. The system has two electrical machines (110, 130), each of which is connected to in each case one of the two propellers. A high-voltage battery (120) and an internal combustion engine (140) are also provided. These compo-
(Continued)

nents of the system are, depending on the type of component, electrically and/or mechanically connected to one another and to the propellers, and a controller of the system controls energy flows between the components depending on the mode of operation or readiness for operation of the components in a redundant manner in such a way that the aircraft can be largely safely operated in various normal and emergency situations.

20 Claims, 4 Drawing Sheets

(51) Int. Cl.
  *B64D 35/08* (2006.01)
  *B64D 27/02* (2006.01)
  *B64D 35/02* (2006.01)
(52) U.S. Cl.
  CPC ......... *B64D 2027/026* (2013.01); *Y02T 50/60* (2013.01)

(56) References Cited

U.S. PATENT DOCUMENTS

| | | |
|---|---|---|
| 2010/0064689 A1 | 3/2010 | Reinhardt |
| 2011/0111906 A1 | 5/2011 | Kim et al. |
| 2011/0121127 A1 | 5/2011 | Certain |
| 2011/0256973 A1 | 10/2011 | Werner et al. |
| 2015/0285165 A1 | 10/2015 | Steinwandel et al. |

FOREIGN PATENT DOCUMENTS

| | | | |
|---|---|---|---|
| DE | 102010029194 A1 | 5/2011 | |
| DE | 102011088907 A1 | 6/2013 | |
| DE | 102012021339 A1 | 4/2014 | |
| DE | 112007002536 B4 | 10/2014 | |
| EP | 1712761 A2 | 10/2006 | |
| EP | 2327625 A1 * | 6/2011 | ............. B64C 27/12 |
| EP | 2327625 A1 | 6/2011 | |
| EP | 2404775 A2 | 1/2012 | |
| WO | WO2014067506 A1 | 5/2014 | |
| WO | WO2015075538 A1 | 5/2015 | |

OTHER PUBLICATIONS

PCT International Search Report and Written Opinion of the International Searching Authority dated Oct. 12, 2016 for corresponding PCT/EP2016/065031.

* cited by examiner

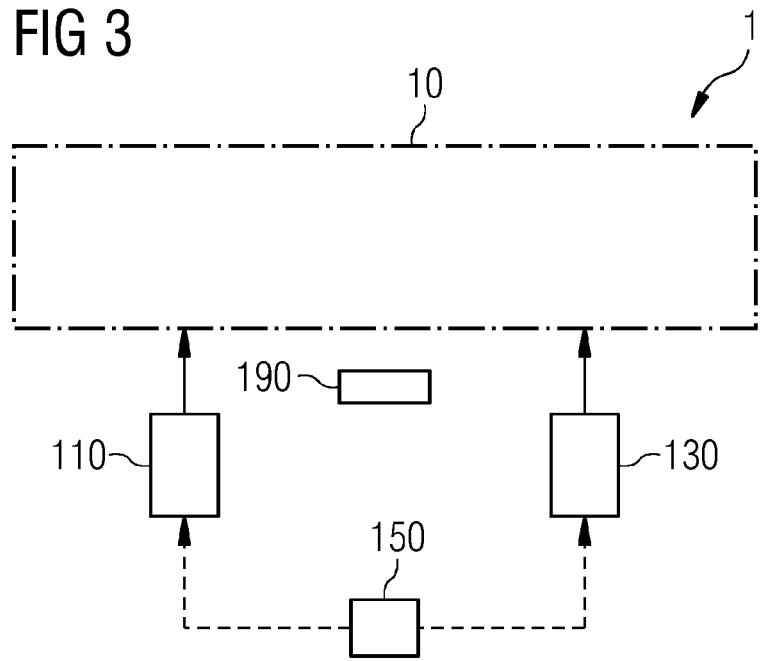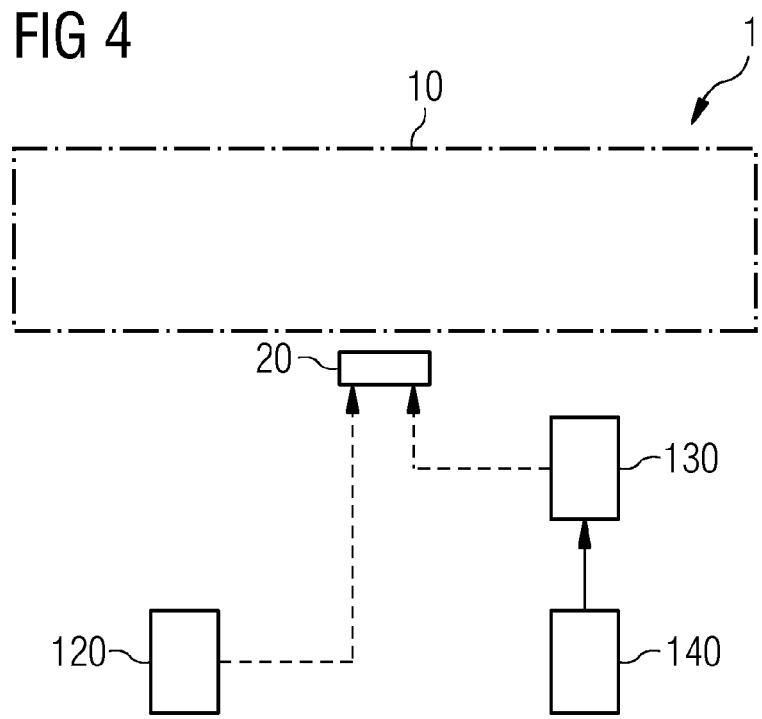

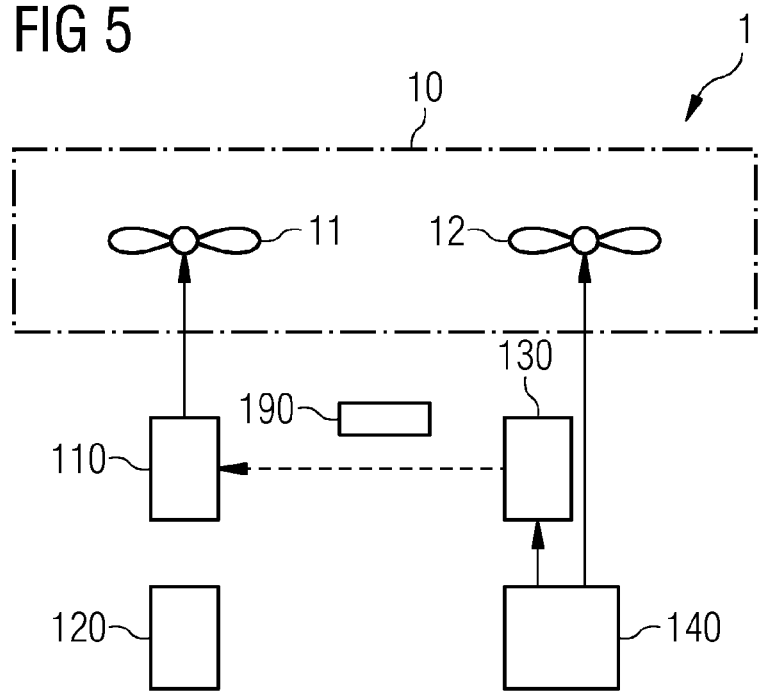
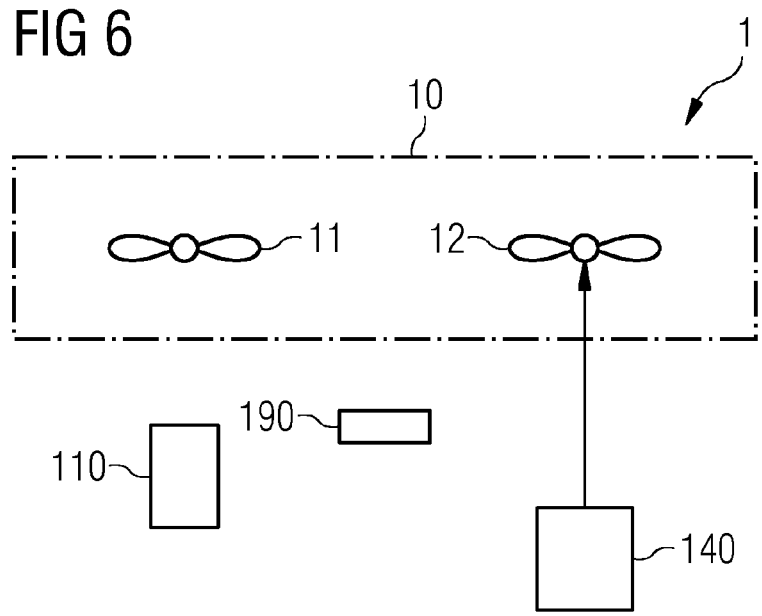

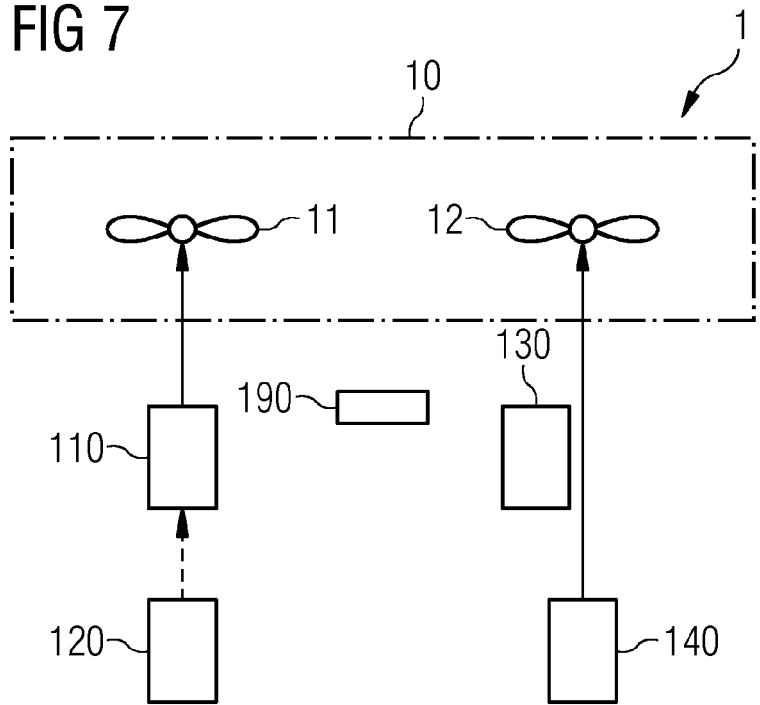
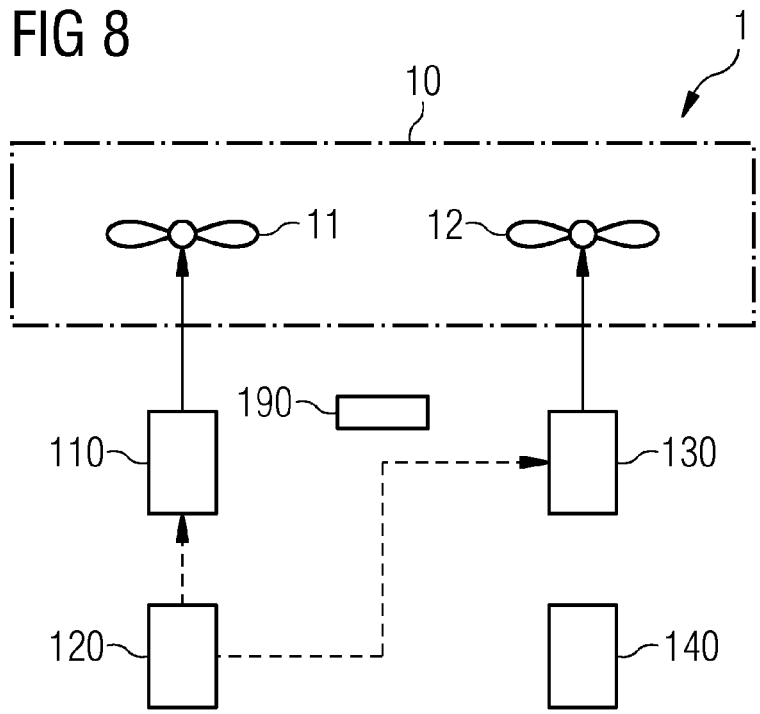

SYSTEM FOR REDUNDANT SUPPLY OF KINETIC ENERGY TO DRIVE SYSTEM OF AIRCRAFT

CROSS REFERENCE TO RELATED APPLICATIONS

The present patent document is a § 371 nationalization of PCT Application Serial Number PCT/EP2016/065031, filed on Jun. 28, 2016, designating the United States, which is hereby incorporated by reference. This patent document also claims the benefit of DE 102015213026.6, filed on Jul. 13, 2015, which is also hereby incorporated by reference.

FIELD

Embodiments relate to a system for providing kinetic energy for a drive system of an aircraft.

BACKGROUND

Single or double combustion machines or engines are often used for the driving of aircraft. For experimental and demonstration purposes, serial-hybrid and parallel-hybrid concepts may be used. Conventional serial-hybrid and parallel-hybrid drive systems are to provide great fault security and provide the performance of conventional drive systems for an efficient operation, especially in terms of weight and power. Redundancies may be provided in the hybrid systems in order to provide good safety. The redundancies, in turn, produce a measure of complexity that is hard to control by engineering and places the goal of heightened safety at risk, since with the complexity the risk of malfunctions or failures of components of the system also increases.

BRIEF SUMMARY AND DESCRIPTION

The scope of the present invention is defined solely by the appended claims and is not affected to any degree by the statements within this summary. The present embodiments may obviate one or more of the drawbacks or limitations in the related art.

Embodiments provide an approach to a drive system for an aircraft that includes improved operating safety.

The system is configured to provide kinetic energy for a drive system, such as a left and a right propeller, of an aircraft. The system includes at least a first electrical machine and a second electrical machine that may be operated as either a generator or an electric motor, an HV battery for providing electrical energy, and a combustion engine for providing kinetic energy. The first electrical machine and the second electrical machine may each be connected mechanically to the drive system to provide at least a portion of the kinetic energy to the drive system. The second electrical machine is electrically connected to the first electrical machine to provide electrical energy to the first electrical machine. The second electrical machine is electrically connected to the HV battery to transfer electrical energy from the second electrical machine to the HV battery or vice versa. The HV battery is electrically connected to the first electrical machine to provide electrical energy to the first electrical machine. The combustion engine may be mechanically connected to the drive system to provide at least a portion of the kinetic energy needed for operation to the drive system. The combustion engine is mechanically connected to the second electrical machine to provide kinetic energy to the second electrical machine. A control system that controls flows of kinetic and/or electrical energy between interconnected components of the system in dependence on an operating state of the system is provided.

The configuration provides for a multiply redundant operation of the drive system.

The first and also the second electrical machine may each be operated optionally in both a generator mode and an electric motor mode, controlled by the control system. In the generator mode, one of the respective machines converts electrical energy supplied to it by an electrical connection into kinetic energy. The kinetic energy provided may then be supplied by a mechanical connection of the machine to a component of the system connected correspondingly to the machine. In the electric motor mode, one of the respective machines converts kinetic energy supplied to the respective machine by a mechanical connection into electrical energy. The electrical energy may then be supplied by an electrical connection of the machine to a component of the system connected correspondingly to the machine.

The components may further include a main battery for the supplying of further electrical consumers of the aircraft, such as an onboard network. The main battery is electrically connected to the HV battery and/or the second electrical machine to provide a charging of the main battery.

The electrical energy of the main battery may be used in certain situations for the providing of the kinetic energy for the drive system.

In a first emergency mode, in which one or more components are faulty, the control system controls the system such that the first and/or the second electrical machine functions as an electric motor, e.g. in the electric motor mode, and that the main battery supplies electrical energy to the electrical machine working as an electric motor and the electrical energy supplied by the main battery is converted into kinetic energy in the respective electrical machine. Each of the electrical machines working as an electric motor may be connected mechanically to the drive system and the respective converted kinetic energy may be supplied by the mechanical connections to the drive system. The drive system and thus the aircraft may continue to operate for the most part safely in the first emergency mode.

Embodiments provide that the system is operated or controlled such that the first and/or the second electrical machine functions as an electric motor. The main battery supplies electrical energy to the electrical machine working as an electric motor and the electrical energy supplied by the main battery is converted into kinetic energy in the respective electrical machine. Each of the electrical machines working as an electric motor herein is connected mechanically to the drive system and the respective converted kinetic energy is supplied by the mechanical connections to the drive system, e.g. to the left and/or right propeller.

In a second emergency mode with faulty main battery, the control system is configured to control the system such that an onboard network of the aircraft is supplied with electrical energy from the HV battery and/or with the second electrical machine working as a generator. The drive system and thus the aircraft in the second emergency mode may continue to be operated for the most part safely.

In an embodiment, the second emergency mode the system is operated or controlled such that the onboard network of the aircraft is supplied with electrical energy from the HV battery and/or with the second electrical machine working as a generator.

In a third emergency mode with a faulty HV battery, e.g. in event of failure or total discharge of the battery, the control system is configured to control the system such that a first portion of the power or kinetic energy provided by the combustion engine may be transferred to the drive system, a second portion of the power or kinetic energy provided by the combustion engine is transferred to the second electrical machine, and the second electrical machine functions as a generator and converts the kinetic energy transferred from the combustion engine to the second electrical machine into electrical energy. The electrical energy provided by the second electrical machine is supplied to the first electrical machine. The first electrical machine functions as an electric motor and converts the electrical energy supplied by the second electrical machine into kinetic energy, that may be supplied to the drive system. The drive system and thus the aircraft may continue to be operated for the most part safely in the third emergency mode.

In an embodiment according to the third emergency mode the system is operated or controlled such that a first portion of the power or kinetic energy provided by the combustion engine is transferred to the drive system, e.g. to the second or right propeller. A second portion of the power or kinetic energy provided by the combustion engine is transferred to the second electrical machine. The second electrical machine functions as a generator and converts the kinetic energy transferred from the combustion engine to the second electrical machine into electrical energy. The electrical energy is provided for further use. The electrical energy provided by the second electrical machine is supplied to the first electrical machine. The first electrical machine functions as an electric motor and herein converts the electrical energy supplied by the second electrical machine into kinetic energy and finally supplied to the drive system, e.g. to the first or left propeller.

In a fourth emergency mode with faulty first electrical machine, the control system is configured to control the system such that the power or kinetic energy provided by the combustion engine may be transferred entirely to the drive system, apart from unavoidable losses, i.e., the combustion engine drives the second propeller directly, while the second electrical machine is not supplied with kinetic energy from the combustion engine. The aircraft, despite the failure of the first electrical machine and despite the associated loss of a portion of the power for the drive system, may continue to be operated and at least a safe landing may be assured.

In an embodiment according to the fourth emergency mode the system is operated or controlled such that the power or kinetic energy provided by the combustion engine may be transferred entirely to the drive system, e.g. to the second or right propeller.

In a fifth emergency mode with faulty second electrical machine, the control system is configured to control the system such that the power or kinetic energy provided by the combustion engine may be transferred entirely to the drive system, e.g., the combustion engine drives the second propeller directly and the second electrical machine is not supplied with kinetic energy from the combustion engine, and a power or electrical energy provided by the HV battery is supplied entirely to the first electrical machine. The first electrical machine functions as an electric motor and converts the electrical energy supplied by the HV battery into kinetic energy that may be supplied to the drive system.

The drive system and thus the aircraft may continue to be operated for the most part safely in the fifth emergency mode.

In an embodiment according to the fifth emergency mode the system is operated or controlled such that the power or kinetic energy provided by the combustion engine is transferred entirely to the drive system. The power or electrical energy provided by the HV battery is supplied entirely to the first electrical machine. The first electrical machine herein functions as an electric motor and converts the electrical energy supplied by the HV battery into kinetic energy. The kinetic energy is supplied to the drive system, e.g. to the first or left propeller.

In a sixth emergency mode with faulty combustion engine, the control system is configured to control the system such that a portion of the electrical energy provided by the HV battery is supplied to the first electrical machine. The first electrical machine functions as an electric motor and converts the electrical energy supplied by the HV battery into kinetic energy, that may be supplied to the drive system, and a further portion of the electrical energy provided by the HV battery is supplied to the second electrical machine. The second electrical machine functions as an electric motor and converts the electrical energy supplied by the HV battery into kinetic energy, that may be supplied to the drive system.

The drive system and thus the aircraft may continue to be operated for the most part safely in the sixth emergency mode.

In an embodiment according to the sixth emergency mode the system is operated or controlled such that a portion of the electrical energy provided by the HV battery is supplied to the first electrical machine. The first electrical machine functions as an electric motor and converts the electrical energy supplied by the HV battery into kinetic energy. The kinetic energy is supplied to the drive system, especially to the first or left propeller. Furthermore, a further portion of the electrical energy provided by the HV battery is supplied to the second electrical machine. The second electrical machine functions as an electric motor and herein converts the electrical energy supplied by the HV battery into kinetic energy. The kinetic energy is supplied to the drive system, e.g. to the second or right propeller.

In a first normal operational state of the system, in which a momentary charge state QHVist of the HV battery corresponds at least to a predetermined nominal charge state QHVsoll (QHVist≥QHVsoll), the control system is configured to control the system such that a first portion of the power or kinetic energy provided by the combustion engine may be transferred to the drive system, a second portion of the power or kinetic energy provided by the combustion engine is transferred to the second electrical machine, and the second electrical machine functions as a generator and converts the kinetic energy transferred from the combustion engine to the second electrical machine into electrical energy. At least a part of the electrical energy provided by the second electrical machine is supplied to the first electrical machine. The first electrical machine functions as an electric motor and converts the electrical energy supplied by the second electrical machine into kinetic energy, that may be supplied to the drive system. The HV battery is not further charged, since the charge state already corresponds to the nominal charge state of typically 100%. Therefore, the full power of the second electrical machine may be used to drive the first electrical machine. Apart from the unavoidable losses, the power or kinetic energy provided by the combustion engine may be supplied entirely to the drive system.

In an embodiment according to the first normal operational state the system is operated or controlled such that a first portion of the power or kinetic energy provided by the combustion engine is transferred to the drive system. A second portion of the power or kinetic energy provided by the combustion engine is transferred to the second electrical machine. The second electrical machine functions as a generator and converts the kinetic energy transferred from the combustion engine to the second electrical machine into electrical energy. The electrical energy is provided for further use. At least a part of the electrical energy provided by the second electrical machine is supplied to the first electrical machine. The first electrical machine functions as an electric motor and converts the electrical energy supplied by the second electrical machine into kinetic energy, that is supplied to the drive system, e.g. to the first or left propeller.

In a second normal operational state of the system, in which a momentary charge state QHVist of the HV battery is lower than a predetermined nominal charge state QHVsoll (QHVist<QHVsoll), the control system is configured to control the system such that a first portion of the power or kinetic energy provided by the combustion engine may be transferred to the drive system, a second portion of the power or kinetic energy provided by the combustion engine is transferred to the second electrical machine, and the second electrical machine functions as a generator and converts the kinetic energy transferred from the combustion engine to the second electrical machine into electrical energy. A part of the electrical energy provided by the second electrical machine is supplied to the first electrical machine. The first electrical machine functions as an electric motor and converts the electrical energy supplied by the second electrical machine into kinetic energy, that may be supplied to the drive system. Another part of the electrical energy provided by the second electrical machine is supplied to the HV battery in order to increase the charge state QHVist.

The power or kinetic energy provided by the combustion engine may be fully utilized in order to supply energy to the drive system and to provide that the HV battery always has an adequate charge state.

In an embodiment according to the second normal operational state the system is operated or controlled such that a first portion of the power or kinetic energy provided by the combustion engine is transferred to the drive system. A second portion of the power or kinetic energy provided by the combustion engine is transferred to the second electrical machine. The second electrical machine functions as a generator and converts the kinetic energy transferred from the combustion engine to the second electrical machine into electrical energy. The electrical energy is provided for further use. A part of the electrical energy provided by the second electrical machine is supplied to the first electrical machine. The first electrical machine functions as an electric motor and converts the electrical energy supplied by the second electrical machine into kinetic energy. The kinetic energy is supplied to the drive system, e.g. to the first or left propeller. Another part of the electrical energy provided by the second electrical machine is supplied to the HV battery in order to increase its charge state QHVist.

In a high-power operational state of the system, in which the aircraft requires power above and beyond the usual power rating for a short or medium term, such as during takeoff, the control system is configured to control the system, for example during takeoff, such that the power or kinetic energy provided by the combustion engine may be transferred entirely to the drive system, i.e., the combustion engine drives the second propeller directly and the second electrical machine is not supplied with kinetic energy from the combustion engine, and a power or electrical energy provided by the HV battery is supplied entirely to the first electrical machine. The first electrical machine functions as an electric motor and converts the electrical energy supplied by the HV battery into kinetic energy, that may be supplied to the drive system. The system provides nearly twice the power rating in the short term, without the combustion engine having to be configured as such.

In an embodiment according to the high-power operational state the system is operated or controlled such that the power or kinetic energy provided by the combustion engine is transferred entirely to the drive system, e.g. to the second or right propeller. A power or electrical energy provided by the HV battery is supplied entirely to the first electrical machine. The first electrical machine functions as an electric motor and converts the electrical energy supplied by the HV battery into kinetic energy, that may be supplied to the drive system, e.g. to the first or left propeller.

In a recuperation mode of the system, e.g. during a lengthy descending flight of the aircraft, the control system is configured to control the system such that the first and the second electrical machine each work as a generator. In the process, a kinetic energy may be supplied from the drive system of the aircraft for the driving of the generators. The kinetic energy supplied from the drive system is converted by the generators into electrical energy and supplied to the HV battery and/or the main battery.

In an embodiment according to the recuperation mode the system is operated or controlled such that the first and the second electrical machine each work as a generator. A kinetic energy is supplied from the drive system of the aircraft for the driving of the generators. For example, the first or left propeller supplies the kinetic energy for the first electrical machine and the second or right propeller supplies the kinetic energy for the second electrical machine. The kinetic energy supplied from the drive system is converted by the generators into electrical energy and provided. The provided electrical energy is supplied to the HV battery and/or the main battery in order to recharge them if required.

The first electrical machine is mechanically connected to a first propeller of the drive system and the second electrical machine as well as the combustion engine are connected to a second propeller of the drive system.

Embodiments provide kinetic energy for a drive system of an aircraft.

There is greater redundancy and thus safety as compared to previous serial-hybrid drives or even pure combustion engine drives. Furthermore, the system may include a modular design. Since the HV battery may be utilized in order to realize power demands above and beyond the usual power rating, the combustion engine may be smaller and thus both lighter and also more economical in design. Furthermore, the combustion engine may operate at the optimal efficiency. Thus, since there is only one operating point, a very simple control system is possible for the combustion engine.

BRIEF DESCRIPTION OF THE FIGURES

FIG. 3 shows the system in a configuration for a first emergency mode according to an embodiment.

FIG. 4 shows the system in a configuration for a second emergency mode according to an embodiment.

FIG. 5 shows the system in a configuration for a third emergency mode according to an embodiment.

FIG. 6 shows the system in a configuration for a fourth emergency mode according to an embodiment.

FIG. 7 shows the system in a configuration for a fifth emergency mode according to an embodiment.

FIG. 8 shows the system in a configuration for a sixth emergency mode according to an embodiment.

DETAILED DESCRIPTION

A mechanical connection of two components refers to a connection that provides the transfer of kinetic energy or rotational energy from one of the components to the other. Accordingly, an electrical connection of two components allows the transfer of electrical energy from one component to the other. In the case of the mechanical connection, the components may be, e.g., a combustion engine, that produces a rotation of a shaft, and an electrical generator. The components are mechanically connected to each other and the kinetic energy thus transferred from the motor to the generator is converted into electrical energy in the generator. The generator may be electrically connected to a battery, for example, in order to feed the generated electrical energy into the battery and store it there. The battery is then electrically connected to an electric motor, in order to provide electrical energy to the electric motor, that the electric motor converts into kinetic energy.

Losses may occur upon converting from one form of energy to another or when energy is transferred from one component to another. In embodiments described below, a first form of energy such as kinetic energy is converted into a second form of energy such as electrical energy, or that energy is transferred from one component to another component, without explicitly mentioning the unavoidable losses. In each case at least part of the energy is converted or transferred.

In the figures, mechanical connections are indicated by solid arrows. The arrows indicate the direction in which the kinetic energy is being transported. Electrical connections are marked by arrows with broken lines. The arrow indicates the direction in which the electrical energy is being transported.

Furthermore, the electrical machines may work in different embodiments or operating modes as a generator or an electric motor. An electrical machine functions as a generator, or in generator mode, when the electrical machine converts a supplied kinetic energy, such as the rotational energy of a motor or (in recuperation mode) of a propeller into electrical energy. An electrical machine functions in electric motor mode when the electrical machine converts, conversely, a supplied electrical energy into kinetic energy, such as rotational energy for driving a propeller.

Figure 1:
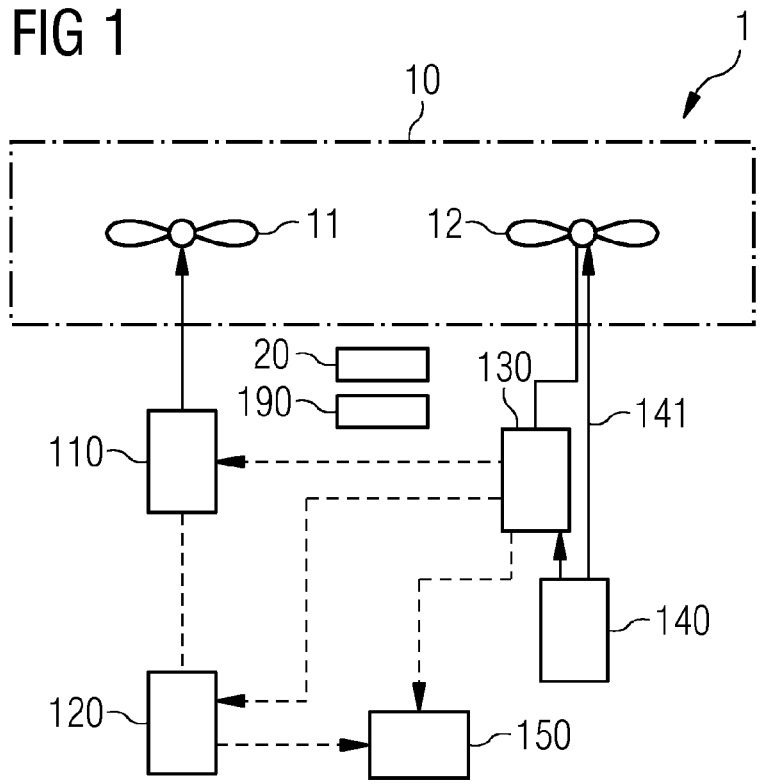
FIG. 1 depicts a system for providing kinetic energy for a drive system of an aircraft in a configuration for a first and a second normal mode according to an embodiment.

FIG. 1 depicts in schematic representation an aircraft 1. The aircraft 1 includes a drive system 10 with a left-side propeller 11 and a right-side propeller 12. A kinetic energy provided to the drive system is supplied to the propellers 11, 12, that convert the supplied kinetic energy into rotational energy and provides propulsion of the aircraft 1. The drive system 10 may have any desired number of propellers, and a kinetic energy supplied to the drive system 10 is distributed among the corresponding propellers by mechanics so that an optimal propulsion of the aircraft is assured. The available kinetic energy may be distributed uniformly between the two sides of the aircraft. As depicted, the drive system 10 has only one propeller 11 on the left side of the aircraft 1 and one propeller 12 on the right side of the aircraft 1.

The aircraft 1 furthermore includes a redundantly designed system 100 with a plurality of components, that serves to provide the kinetic energy for the drive system 10.

The redundant design of the system 100 provides that in various emergency situations in which various components of the system 100 are faulty, the system 100 may continue to be ensured that the drive system 10 is supplied with kinetic energy so that at least a landing of the aircraft 1 is possible. Herein, the term "faulty" may refer to that the faulty component is not available for technical or other reasons or is not providing the required power for a normal operation of the component.

FIG. 1 as well as the other figures describes various operating modes of the system 100, with each Figure explaining only the components and connections of the system 100 used for the operating modes being described in each case. The components not required for the operating mode being described are not represented. FIG. 1 depicts all components of the system 100 represented, regardless of whether they are required for the operating modes described.

The flows of kinetic and/or electrical energy between interconnected components of the system 100 that are used in the different operating modes are realized with the aid of a control system 190 of the system 100. The control system 190 is connected to the different components of the system 100. The connections are not depicted individually in the figures for the sake of clarity. The control system 190 may control the components such that the types of behavior of the system 100 described below for the respective operating modes are implemented.

The system 100 includes a first electrical machine 110 that is mechanically connected to the drive system 10 and, for example, to the left propeller 11 to provide kinetic energy to the drive system 10 or to the left propeller 11. The first electrical machine 110, depending on the operating mode of the system 100, may be operated as an electric motor, i.e. in an electric motor mode, or as a generator, i.e. in a generator mode. Furthermore, the system 100 includes a high-voltage battery (HV battery) 120 that is electrically connected to the first electrical machine 110 to supply the first electrical machine 110 with electrical energy when the first electrical machine 110 is working as an electric motor.

The system 100 includes a second electrical machine 130 that is mechanically connected to the drive system 10 and, for example, to the right propeller 12 to provide kinetic energy to the drive system 10 or the right propeller 12. The second electrical machine 130, depending on the operating mode of the system 100, may be operated as an electric motor, e.g. in an electric motor mode, or as a generator, e.g. in a generator mode.

In addition to the two electrical machines 110, 130, with which kinetic energy may be provided to the drive system 10 depending on the operating mode of the machines 110, 130, the system 100 includes a combustion engine 140 that is mechanically connected to the second electrical machine 130 and connected to the drive system 10 or to the right propeller 12. The combustion engine 140 provides kinetic energy during operation that is supplied to the drive system 10 or to the propeller 12 and/or to the second electrical machine 130 depending on the demand or the operational state of the system 100.

In a normal operational state of the system 100 in which all components are working normally, i.e. are not faulty, the combustion engine 140 generates a known power or kinetic energy at optimal efficiency. A portion of the power is conducted across a freewheeling shaft 141 directly to the right propeller 12 and has the effect of placing it in rotation. Another portion of the power generated by the combustion engine 140 is supplied to the second electrical machine 130. The second electrical machine 130 functions as a generator in the normal operational state and converts the supplied kinetic energy into electrical energy. The second electrical machine 130 is electrically connected to both the first electrical machine 110 and the HV battery 120 and the generated electrical energy is provided according to the operational conditions to the HV battery 120 and/or to the first electrical machine 110.

In a first normal operational state, in which a momentary charge state QHVist of the HV battery 120 corresponds at least to a predetermined nominal charge state QHVsoll (i.e., QHVist≥QHVsoll), a first portion of the power or kinetic energy provided by the combustion engine 140 is transferred to the drive system 10 and the propeller 12. The portion may be, for example, 50%. The remaining portion of the power or kinetic energy provided by the combustion engine 140 is transferred to the second electrical machine 130. The electrical energy provided by the second electrical machine 130 working as a generator is supplied entirely to the first electrical machine 110. The first electrical machine 110 functions as an electric motor in the normal operational state and converts the electrical energy supplied by the second electrical machine 130 into kinetic energy that may then be supplied to the drive system 10 and, for example, the left propeller 11. In the first normal operational state, the kinetic energy provided by the combustion engine 140 may be distributed, e.g., such that 50% of the energy is supplied directly to the drive system 10 and another 50% goes to the drive system 10 across the first electrical machine 110.

In a second normal operational state of the system 100, in which the momentary charge state QHVist of the HV battery 120 is lower than the predetermined nominal charge state QHVsoll (i.e., QHVist<QHVsoll), only a portion of the electrical energy provided by the second electrical machine 130 is supplied to the first electrical machine 110. The first electrical machine 110 functions as an electric motor and converts the supplied electrical energy into kinetic energy that is supplied to the drive system 10. The remaining part of the electrical energy provided by the second electrical machine 130 is supplied to the HV battery 120 in order to charge the HV battery 120 so much that a momentary charge state corresponds at least to the nominal charge state. Once the condition has been achieved, the system 100 is again operated in the first normal operational state. In the second normal operational state the kinetic energy provided by the combustion engine 140 may be distributed for example such that 40% is supplied directly to the drive system 10 and another 40% goes to the drive system 10 across the first electrical machine 110, while the remaining 20% is used to charge the HV battery 120.

The power or kinetic energy provided by the combustion engine 140 may be totally utilized to supply the drive system 10 with energy and to provide that the HV battery 120 always has a sufficient charge state. The HV battery 120 will not be further charged in the first normal operational state, since the charge state already corresponds to the nominal charge state of 100%. Therefore, the full power of the second electrical machine 130 may be utilized for driving the first electrical machine 110. Apart from the unavoidable losses, the power or kinetic energy provided by the combustion engine 140 may be entirely supplied to the drive system 10.

The system 100 furthermore includes a main battery 150 that is primarily used to supply electrical energy to an onboard electrical network 20 of the aircraft 1 and the components typically contained in the aircraft 1. The term onboard network 20 refers to one or more electrical consumers of the aircraft 1. The main battery 150 is electrically connected to the HV battery 120 and/or to the second electrical machine 130, in order to cause a charging of the main battery 150 from at least one of these electrical energy sources when needed.

In the normal operational state, at least three different modes are possible:

In the normal mode, the combustion engine 140 as already described generates a nominal power, that is divided up between the left and the right propeller 11, 12 across the freewheeling shaft 141 on the one hand and across the second and first electrical machine 130, 110 on the other hand, in the amount of 50% each. If necessary, for example, 20% of the nominal power will be used to charge the HV battery 120. The propellers each have 40% of the nominal power available to them.

In a high-power mode, in which the aircraft 1 requires power above and beyond the usual power rating for a short or medium term, for example, such as during takeoff, the combustion engine 140 continues to generate nominal power, but the control system 190 is configured so that 100% of the power of the combustion engine 140 is provided directly to the drive system 10 and the right propeller 12. At the same time, the first electrical machine 110 functions as an electric motor and makes the provided kinetic energy available to the drive system 10 and the propeller 11. The electrical energy required is drawn from the HV battery 120. The power of the first electrical machine 110 corresponds to the power of the combustion engine 140. The overall power generated here thus corresponds to twice the permanent power rating of the combustion engine 140.

Figure 2:
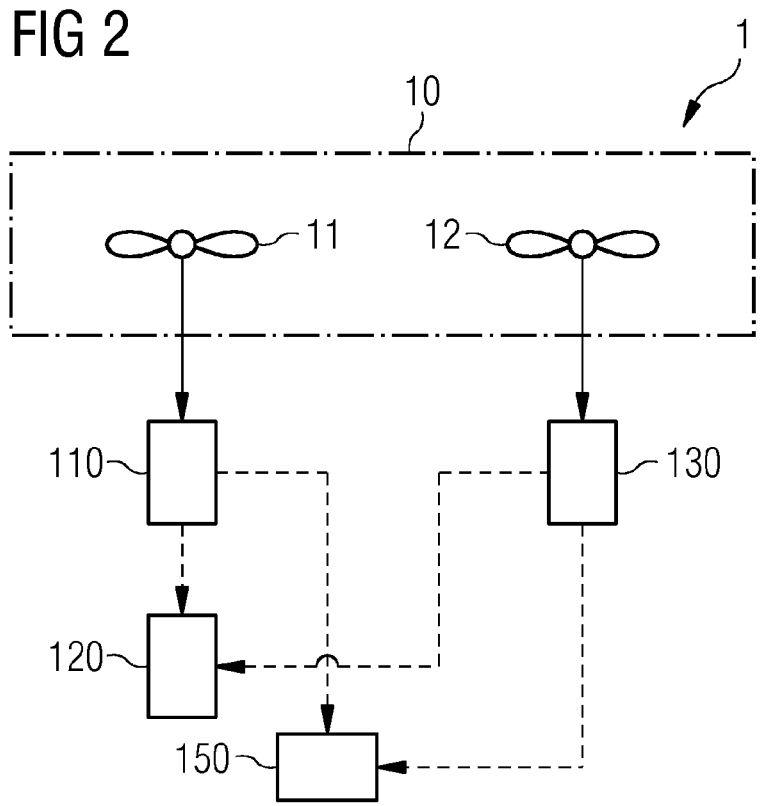
FIG. 2 shows the system in a configuration for a recuperation mode according to an embodiment.

In a recuperation mode that is depicted in FIG. 2, the first 110 and the second electrical machine 130 each work as a generator. The kinetic energy needed to drive the generators 110, 130 in each case is supplied from the drive system 10 of the aircraft 1, e.g., the propellers 11, 12 drive the first 110 and the second electrical machine 130. The kinetic energy supplied from the drive system 10 is converted by the generators 110, 130 into electrical energy and provided. The electrical energy thus provided is supplied to the HV battery 120 and/or the main battery 150 to charge the batteries if needed. The system 100 may be operated in the recuperation mode for example during a descent flight of the aircraft 1.

In a first emergency mode of the system 100, depicted in FIG. 3, and in which generally one or more components of the system 100 are faulty, the control system 190 functions such that the first 110 and/or the second electrical machine 130 functions as an electric motor, e.g., in the electric motor mode. The main battery 150 functions as an emergency battery and supplies electrical energy to the electrical machines 110, 130 working as an electric motor. The electrical energy supplied by the main battery 150 is converted into kinetic energy in the respective electrical machine 110, 130. The kinetic energy produced is supplied to the drive system 10.

The main or emergency battery 150 may be configured and the system 100 controlled such that the battery 150 is always 100% charged. In normal operation, the main battery 150 is responsible only for supplying the onboard network 20, but in an emergency main battery 150 may supply the entire system 100 at least for a short span of time. The capacity is configured such that at least an immediate emergency landing of the aircraft 1 is possible.

In a second emergency mode depicted in FIG. 4, in which the main battery 150 is faulty and insufficient or no electrical voltage is available, for example, the control system is configured such that the onboard network 20 of the aircraft 1 is energized from the HV battery 120. Alternatively, or additionally, electrical energy for the onboard network 20 may be made available by the second electrical machine 130, energized by the combustion engine 140, working as a generator and at least part of the electrical energy provided is made available to the onboard network 20.

FIG. 5 depicts a third emergency mode with faulty HV battery 120, e.g. during failure or total discharge of the battery 120. The control system 190 is configured to control the system 100 such that a first portion of the power or kinetic energy provided by the combustion engine 140 may be transferred directly to the drive system 10, for example, across the freewheeling shaft 141. A second portion of the power or kinetic energy provided by the combustion engine 140 is transferred to the second electrical machine 130, the second electrical machine 130 working as a generator and converting the kinetic energy transferred from the combustion engine 140 into electrical energy. The electrical energy provided by the second electrical machine 130 is supplied to the first electrical machine 110. The first electrical machine 110 functions as an electric motor and converts the electrical energy supplied by the second electrical machine 130 into kinetic energy. The kinetic energy may be supplied to the drive system 10 and, for example, the left propeller 11. The dividing up of the power provided by the combustion engine 140 may be done so that each time 50% of the power is supplied to the left and the right propeller 11, 12.

The second electrical machine 130 in the generator mode and the emergency battery 150 constitute redundant energy sources for the system 100, so that even in the event of a further failure of one of these two components an energy source will still be available to the system 100.

In a fourth emergency mode, depicted in FIG. 6, the first electrical machine 110 is faulty. The control system 190 is configured to control the system 100 such that the power or kinetic energy provided by the combustion engine 140 may be transferred entirely to the drive system 10, e.g., the combustion engine 140 drives the right propeller 12 directly and the second electrical machine 130 is not supplied with kinetic energy from the combustion engine 140. The aircraft, despite the failure of the first electrical machine 110 and despite the associated losses of part of the power for the drive system 10, may continue to be operated and thus at least a safe landing is assured.

In the configuration described in FIG. 6, 100% of the kinetic energy provided by the combustion engine 140 flows to the right propeller 12. The redundancy of the drive sources remains intact, since besides the combustion engine 140 the second electrical machine 130 is also available as a source of kinetic energy for the drive system 10. The HV battery 120 and the main battery 150 are available as redundant energy sources for supplying the second electrical machine 130 working as a generator and the combustion engine 140.

FIG. 7 depicts a fifth emergency mode in which the second electrical machine 130 is faulty. The control system 190 is configured to control the system 100 such that the power or kinetic energy provided by the combustion engine 140 may be transferred entirely to the drive system 10 and to the right propeller 12, e.g., the combustion engine 140 drives the right propeller 12 directly and the second electrical machine 130 is not supplied with kinetic energy from the combustion engine 140. A power or electrical energy provided by the HV battery 120 is supplied entirely to the first electrical machine 110. The first electrical machine 110 functions as an electric motor and converts the electrical energy supplied by the HV battery 120 into kinetic energy that may be supplied to the drive system 10 and to the left propeller 11.

100% of the power provided by the HV battery 120 is transferred to the left propeller 11, while 100% of the power made available by the combustion engine 140 is supplied to the right propeller 12. The redundancy of the drive sources in turn remains intact, since the first electrical machine 110 and the combustion engine 140 are available. The HV battery 120 and the main battery 150 are available as redundant energy sources.

In a sixth emergency mode, depicted in FIG. 8, the combustion engine 140 is faulty. The control system 190 is configured to control the system 100 such that a portion of the electrical energy provided by the HV battery 120 is supplied to the first electrical machine 110. The first electrical machine 110 functions as an electric motor and converts the electrical energy supplied by the HV battery 120 into kinetic energy that may be supplied to the drive system 10 and to the left propeller 11. A further portion of the electrical energy provided by the HV battery 120 is supplied to the second electrical machine 130. The second electrical machine 130 functions as an electric motor and converts the electrical energy supplied by the HV battery 120 into kinetic energy that may be supplied to the drive system 10 and to the right propeller 12.

The dividing up of the power available from the HV battery 120 may be done such that each time 50% of the power flows to the left and to the right propeller. The redundancy of the drive sources remains intact, since the first and the second electrical machine are available in generator mode. The HV battery 120 and the main battery 150 are available as redundant energy sources.

In the embodiments or operating modes of the drive system 10, the energy available from one or more sources of kinetic energy may be used by not only the left or right propeller 11, 12, but instead to make the kinetic energy available to the drive system 10 with the aid of corresponding couplings, drives and gearings, etc. By a suitable control system, the available kinetic energy is supplied to the propellers 11, 12 in any desired relations, regardless of its source. In an embodiment, the propellers may be supplied with kinetic energy in equal parts.

It is to be understood that the elements and features recited in the appended claims may be combined in different ways to produce new claims that likewise fall within the scope of the present invention. Thus, whereas the dependent claims appended below depend from only a single independent or dependent claim, it is to be understood that these dependent claims may, alternatively, be made to depend in the alternative from any preceding or following claim, whether independent or dependent, and that such new combinations are to be understood as forming a part of the present specification.

While the present invention has been described above by reference to various embodiments, it may be understood that many changes and modifications may be made to the described embodiments. It is therefore intended that the foregoing description be regarded as illustrative rather than limiting, and that it be understood that all equivalents and/or combinations of embodiments are intended to be included in this description.

The invention claimed is:

1. A system for providing kinetic energy for a drive system of an aircraft, the system comprising:
a first electrical machine and a second electrical machine, each of the first electrical machine and the second electrical machine configured to operate as a generator or an electric motor;

an HV battery configured to provide electrical energy;
a combustion engine configured to provide kinetic energy; and
a control system configured to control flows of kinetic, electrical, or kinetic and electrical energy between the first electrical machine, the second electrical machine, the HV battery, and the combustion engine based on an operating state of the system;
wherein the first electrical machine and the second electrical machine are connected mechanically to the drive system to provide kinetic energy to the drive system;
wherein the second electrical machine is electrically connectable to the first electrical machine, such that the second electrical machine is configured to provide electrical energy to the first electrical machine;
wherein the second electrical machine is electrically connected to the HV battery to transfer electrical energy from the second electrical machine to the HV battery or to transfer electrical energy from the HV battery to the second electrical machine,
wherein the HV battery is electrically connected to the first electrical machine, the combustion engine is mechanically connectable to the drive system to provide kinetic energy to the drive system, and the combustion engine is mechanically connectable to the second electrical machine to provide kinetic energy to the second electrical machine,
wherein the control system is configured to control the system in a first normal operational state, in which a momentary charge state of the HV battery corresponds at least to a predetermined nominal charge state, such that a first portion of the kinetic energy provided by the combustion engine is transferrable to the drive system, a second portion of the kinetic energy provided by the combustion engine is transferred to the second electrical machine, and the second electrical machine functions as a generator and converts the kinetic energy transferred from the combustion engine into electrical energy and provides the electrical energy,
wherein all of the electrical energy provided by the second electrical machine is supplied to the first electrical machine, and
wherein the first electrical machine functions as an electric motor and converts the electrical energy supplied by the second electrical machine into kinetic energy that is suppliable to the drive system.

2. The system of claim 1, further comprising:
a main battery configured to supply electrical consumers of the aircraft, wherein the main battery is electrically connected to the HV battery, the second electrical machine, or the HV battery and the second electrical machine, such that the main battery is chargeable.

3. The system of claim 2, wherein the control system is configured to control the system in an emergency mode in which the first electrical machine, the second electrical machine, the HV battery, the main battery, or lithe combustion engine, or any combination thereof is faulty, such that:
the first electrical machine, the second electrical machine, or the first electrical machine and the second electrical machine function as an electric motor, and
the main battery supplies electrical energy to the first electrical machine, the second electrical machine, or the first electrical machine and the second electrical machine functioning as an electric motor, and the electrical energy supplied by the main battery is converted into kinetic energy in the respective electrical machine, and
wherein the first electrical machine, the second electrical machine, or the first electrical machine and the second electrical machine working as an electric motor, respectively, is connectable mechanically to the drive system, and the respective converted kinetic energy is suppliable by the mechanical connections to the drive system.

4. The system of claim 2, wherein the control system is configured to control the system in an emergency mode with a faulty main battery such that an onboard network of the aircraft is supplied with electrical energy from the HV battery, the second electrical machine working as a generator, or the HV battery and the second electrical machine working as a generator.

5. The system of claim 2, wherein the control system is configured to control the system in an emergency mode with a faulty HV battery such that:
a first portion of the kinetic energy provided by the combustion engine is transferrable to the drive system,
a second portion of the kinetic energy provided by the combustion engine is transferred to the second electrical machine, and
the second electrical machine functions as a generator and converts the kinetic energy transferred from the combustion engine into electrical energy and provides electrical energy,
wherein the electrical energy provided by the second electrical machine is supplied to the first electrical machine, and
wherein the first electrical machine functions as an electric motor and converts the electrical energy supplied by the second electrical machine into kinetic energy that is supplied to the drive system.

6. The system of claim 2, wherein the control system is configured to control the system in an emergency mode with a faulty first electrical machine such that the kinetic energy provided by the combustion engine is transferred entirely to the drive system.

7. The system of claim 2, wherein the control system is configured to control the system in an emergency mode with a faulty second electrical machine such that the kinetic energy provided by the combustion engine is transferred entirely to the drive system and electrical energy provided by the HV battery is supplied entirely to the first electrical machine, and
wherein the first electrical machine functions as an electric motor and converts the electrical energy supplied by the HV battery into kinetic energy that is supplied to the drive system.

8. The system of claim 2, wherein the control system is configured to control the system in an emergency mode with a faulty combustion engine such that a first portion of the electrical energy provided by the HV battery is supplied to the first electrical machine,
wherein the first electrical machine functions as an electric motor and converts the electrical energy supplied by the HV battery into kinetic energy that is suppliable to the drive system, and a second portion of the electrical energy provided by the HV battery is supplied to the second electrical machine, and
wherein the second electrical machine functions as an electric motor and converts the electrical energy supplied by the HV battery into kinetic energy that is suppliable to the drive system.

9. The system of claim 2, wherein the control system is configured to control the system in a second normal operational state, in which a momentary charge state of the HV battery is lower than a predetermined nominal charge state, such that a first portion of the kinetic energy provided by the combustion engine is transferred to the drive system, a second portion of the kinetic energy provided by the combustion engine is transferred to the second electrical machine, and the second electrical machine functions as a generator and converts the kinetic energy transferred from the combustion engine into electrical energy and provides the electrical energy, wherein a part of the electrical energy provided by the second electrical machine-is supplied to the first electrical machine, and wherein the first electrical machine functions as an electric motor and converts the electrical energy supplied by the second electrical machine into kinetic energy that is suppliable to the drive system, and a second portion of the electrical energy provided by the second electrical machine is supplied to the HV battery to increase the momentary charge state.

10. The system of claim 2, wherein the control system is configured to control the system in a high-power operational state, in which the drive system requires power above and beyond a power rating of the combustion engine, such that the kinetic energy provided by the combustion engine is transferrable entirely to the drive system, and an electrical energy provided by the HV battery is supplied entirely to the first electrical machine, and wherein the first electrical machine functions as an electric motor and converts the electrical energy supplied by the HV battery into kinetic energy that is suppliable entirely to the drive system.

11. The system of claim 2, wherein the control system is configured to control the system in a recuperation mode such that the first electrical machine and the second electrical machine each function as a generator, and wherein a kinetic energy is suppliable from the drive system of the aircraft for the driving of the first electrical machine and the second electrical machine, wherein the kinetic energy supplied from the drive system is converted by the first electrical machine and the second electrical machine into electrical energy and provided, and wherein the provided electrical energy is suppliable to the HV battery, the main battery, or the HV battery and the main battery.

12. The system of claim 2, wherein the first electrical machine is mechanically connected to a first propeller of the drive system, and the second electrical machine and the combustion engine are connected to a second propeller of the drive system.

13. The system of claim 12, wherein the combustion engine is mechanically connected to only the second propeller.

14. The system of claim 1, wherein the control system is configured to control the system in an emergency mode with a faulty HV battery such that a first portion of the kinetic energy provided by the combustion engine is transferred to the drive system, a second portion of the kinetic energy provided by the combustion engine is transferred to the second electrical machine, and the second electrical machine functions as a generator and converts the kinetic energy transferred from the combustion engine into electrical energy and provides electrical energy to the first electrical machine, and wherein the first electrical machine functions as an electric motor and converts the electrical energy supplied by the second electrical machine into kinetic energy that is supplied to the drive system.

15. The system of claim 1, wherein the control system is configured to control the system in an emergency mode with a faulty first electrical machine such that the kinetic energy provided by the combustion engine is transferred entirely to the drive system.

16. The system of claim 1, wherein the control system is configured to control the system in an emergency mode with a faulty second electrical machine such that the kinetic energy provided by the combustion engine is transferred entirely to the drive system and electrical energy provided by the HV battery is supplied entirely to the first electrical machine, and wherein the first electrical machine functions as an electric motor and converts the electrical energy supplied by the HV battery into kinetic energy that is supplied to the drive system.

17. The system of claim 1, wherein the control system is configured to control the system in an emergency mode with a faulty combustion engine such that a first portion of the electrical energy provided by the HV battery is supplied to the first electrical machine, wherein the first electrical machine functions as an electric motor and converts the electrical energy supplied by the HV battery into kinetic energy that is supplied to the drive system and a second portion of the electrical energy provided by the HV battery is supplied to the second electrical machine, and wherein the second electrical machine functions as an electric motor and converts the electrical energy supplied by the HV battery into kinetic energy that is supplied to the drive system.

18. The system of claim 1, wherein the control system is configured to control the system in a normal operational state, in which a momentary charge state of the HV battery corresponds at least to a predetermined nominal charge state, such that a first portion of the kinetic energy provided by the combustion engine is transferred to the drive system, and a second portion of the kinetic energy provided by the combustion engine is transferred to the second electrical machine, wherein the second electrical machine functions as a generator and converts the kinetic energy transferred from the combustion engine into electrical energy that is supplied to the first electrical machine, and wherein the first electrical machine functions as an electric motor and converts the electrical energy supplied by the second electrical machine into kinetic energy that is supplied to the drive system.

19. The system of claim 1, wherein the control system is configured to control the system in a normal operational state, in which a momentary charge state of the HV battery is lower than a predetermined nominal charge state, such that a first portion of the kinetic energy provided by the combustion engine is transferred to the drive system, a second portion of the kinetic energy provided by the combustion engine is transferred to the second electrical machine, and the second electrical machine functions as a generator and converts the kinetic energy transferred from the combustion engine into electrical energy for which a first portion is supplied to the first electrical machine, wherein the first electrical machine functions as an electric motor and converts the electrical energy supplied by the second electrical machine into kinetic energy that is supplied to the drive system, and a second portion of the electrical energy provided by the second electrical machine is supplied to the HV battery to increase the momentary charge state.

20. The system of claim 1, wherein the control system is configured to control the system in a high-power operational state, in which the drive system requires power above and beyond a power rating of the combustion engine, such that the kinetic energy provided by the combustion engine is transferred entirely to the drive system and electrical energy provided by the HV battery is supplied entirely to the first electrical machine, and wherein the first electrical machine functions as an electric motor and converts the electrical energy supplied by the HV battery into kinetic energy that is supplied entirely to the drive system.

* * * * *

UNITED STATES PATENT AND TRADEMARK OFFICE
CERTIFICATE OF CORRECTION

PATENT NO. : 10,787,271 B2
APPLICATION NO. : 15/744329
DATED : September 29, 2020
INVENTOR(S) : Peter Barth, Klaus Braun and Stefan Dünsbier It is certified that error appears in the above-identified patent and that said Letters Patent is hereby corrected as shown below:

On the Title Page

(72) Inventors:
"Nuremberg"
Should be replaced with:
"Nürnberg"

Signed and Sealed this
Sixteenth Day of March, 2021

Drew Hirshfeld
*Performing the Functions and Duties of the
Under Secretary of Commerce for Intellectual Property and
Director of the United States Patent and Trademark Office*